(12) United States Patent
Hoggarth et al.

(10) Patent No.: US 11,137,628 B2
(45) Date of Patent: Oct. 5, 2021

(54) PRIVACY SYSTEM AND METHOD FOR A VEHICLE

(71) Applicant: FORD GLOBAL TECHNOLOGIES, LLC, Dearborn, MI (US)

(72) Inventors: Marcus Hoggarth, Hertfordshire (GB); Matthew Graeme Leck, Ruislip (GB); Morten Warren, Cobham (GB); Susan Cook, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 439 days.

(21) Appl. No.: 15/963,471

(22) Filed: Apr. 26, 2018

(65) Prior Publication Data

US 2018/0314081 A1 Nov. 1, 2018

(30) Foreign Application Priority Data

Apr. 26, 2017 (GB) ..................................... 1706609

(51) Int. Cl.
  *G02F 1/133* (2006.01)
  *G02F 1/01* (2006.01)
  *G10K 11/175* (2006.01)
  *B60J 3/04* (2006.01)
  *G10K 11/178* (2006.01)
  (Continued)

(52) U.S. Cl.
  CPC .............. *G02F 1/0121* (2013.01); *B60J 3/04* (2013.01); *G01H 11/06* (2013.01); *G10K 11/175* (2013.01);
  (Continued)

(58) Field of Classification Search
  CPC ...... H01L 27/3237; B60J 3/04; G02F 1/0121; G02F 1/01; G02F 1/13306; G02F 1/133; G01H 11/06; G10K 11/175; G10K 11/178
  (Continued)

(56) References Cited

U.S. PATENT DOCUMENTS 10,802,300 B2 * 10/2020 Ibrahim ................ B64C 1/1484
11,061,437 B2 * 7/2021 Han ....................... G06F 1/1641
(Continued)

FOREIGN PATENT DOCUMENTS

DE  102010021563 A1  12/2011
DE  102014201098 A1  7/2015
(Continued)

OTHER PUBLICATIONS

English Machine Translation of DE102010021563A1.
English Machine Translation of DE102014201098A1.
English Machine Translation of JP2008222094A.

*Primary Examiner* — William R Alexander
(74) *Attorney, Agent, or Firm* — Carlson, Gaskey & Olds, P.C.; David Coppiellie, Esq.

(57) ABSTRACT

A privacy system for a vehicle, including: a window configured to selectively switch between transparent and non-transparent states and to simultaneously have a transparent zone and a non-transparent zone, an elongate touch sensitive sensor provided adjacent to the window, and a controller configured to receive a signal from the elongate touch sensitive sensor and control the transparency of the window such that a transition line between the transparent zone and the non-transparent zone is substantially aligned with and follows a point at which the elongate touch sensitive sensor is being touched.

20 Claims, 6 Drawing Sheets

(51) Int. Cl.
*G01H 11/06* (2006.01)
*H01L 27/32* (2006.01)

(52) U.S. Cl.
CPC ............ *G10K 11/178* (2013.01); *G02F 1/133* (2013.01); *G02F 1/13306* (2013.01); *G10K 2210/12821* (2013.01); *H01L 27/3237* (2013.01)

(58) Field of Classification Search
USPC .......................................... 359/238; 349/16
See application file for complete search history.

(56) References Cited

U.S. PATENT DOCUMENTS

| | | | | |
|---|---|---|---|---|
| 2007/0154063 | A1* | 7/2007 | Breed | B60N 2/028 382/100 |
| 2009/0015740 | A1* | 1/2009 | Sagitov | B60J 3/04 349/16 |
| 2012/0230504 | A1 | 9/2012 | Kuroda | |
| 2012/0269358 | A1 | 10/2012 | Gee et al. | |
| 2013/0161971 | A1* | 6/2013 | Bugno | B64C 1/1492 296/97.2 |
| 2016/0086592 | A1 | 3/2016 | Saxman et al. | |
| 2016/0318379 | A1 | 11/2016 | Okuda et al. | |
| 2018/0284932 | A1* | 10/2018 | Nehmad | G06F 3/0487 |
| 2019/0113776 | A1* | 4/2019 | Ibrahim | G02F 1/0121 |
| 2020/0123845 | A1* | 4/2020 | Busscher | E06B 9/24 |
| 2020/0257334 | A1* | 8/2020 | Han | H04M 1/0268 |

FOREIGN PATENT DOCUMENTS

| | | |
|---|---|---|
| EP | 3006239 A2 | 4/2016 |
| EP | 1688910 A1 | 8/2016 |
| JP | 2008222094 A | 9/2008 |
| WO | 2016116120 A1 | 7/2016 |

* cited by examiner

PRIVACY SYSTEM AND METHOD FOR A VEHICLE

TECHNICAL FIELD

This disclosure relates generally to a privacy system and method for a vehicle and particularly, although not exclusively, relates to a privacy system and method for a vehicle comprising a window configured to selectively switch between transparent and non-transparent states to increase the privacy of a vehicle occupant.

BACKGROUND

A vehicle occupant will sometimes want to change the transparency of the vehicle window in order to create an environment conducive to relaxation and/or sleep, or to reduce the ability of those outside the vehicle to view the occupant within the vehicle, thereby increasing the occupant's feeling of privacy.

The most convenient way to achieve a feeling of privacy within a vehicle can be by using blinds or curtains that are attached to the inside surface to the window, using one way privacy films or stickers that are permanently attached to the interior or exterior of the window or by using high reflective coated glass to construct the window itself.

A vehicle occupant may also want to reduce the amount of light they experience from within the vehicle due to a period of especially strong sunlight or to avoid sun exposure to the skin or eyes. The occupant may also want to increase the amount of light penetrating the window for opposite reasons.

The most convenient way to change the amount of light an occupant experiences within the vehicle is to control the amount of light that penetrates through one or more of the vehicles windows. Controlling light permeability of the windows can be achieved by using attachable shades that are stuck to the inside of the window or by attaching tinted films or stickers to the windows.

The above described systems are not always convenient to use because they can become detached, are not a good fit to the vehicle window thereby leaving gaps on the window for light to penetrate, or they restrict light to a predetermined and unchangeable amount. Furthermore, once the systems are established and in place it is not always easy for the vehicle occupant to quickly and completely view the outside world from within the vehicle.

When a vehicle occupant wishes to create an environment conducive to relaxation and/or sleep, or to increase their feeling of privacy, the occupant may also want to change the amount of noise they experience from within the vehicle.

The most convenient way to change the amount of noise an occupant experiences from within the vehicle is usually by the occupant adopting a device over or in their ears to physically block sound. Noise cancelling headphones, ear plugs or other additional physical devices are commonly worn to block out noise.

However, it is not always easy, quick or convenient for the occupant to use such devices and they can become uncomfortable if worn for a period of time. Furthermore, when the devices are worn they significantly hinder that person's ability to easily communication, either verbally or via a device, with further persons both inside and outside the vehicle.

SUMMARY

According to an aspect of the present disclosure, there is provided a privacy system for a vehicle, the privacy system comprising: a window for the vehicle, the window being configured to selectively switch between transparent and non-transparent states and to simultaneously have a transparent zone and a non-transparent zone; an elongate touch sensitive sensor providable in a trim portion of the vehicle adjacent to the window such that the elongate touch sensitive sensor is aligned to an edge of the window; and a controller configured to receive a signal from the elongate touch sensitive sensor and control the transparency of the window such that a transition line between the transparent zone and the non-transparent zone is substantially aligned with and follows a point at which the elongate touch sensitive sensor is being touched, wherein the elongate touch sensitive sensor is embeddable beneath a layer of the trim.

Touch along the longitudinal axis of the elongate touch sensitive sensor may be a first input gesture.

The non-transparent zone may be opaque or translucent. The non-transparent zone may block a predetermined amount of light from passing through the window.

The window may comprise a Liquid Crystal Display (LCD) or Organic Light Emitting Diode Display (OLED).

The elongate touch sensitive sensor may comprises a capacitive touch sensor.

The elongate touch sensitive sensor may extend over a section of an interior trim portion of the vehicle. The elongate touch sensitive sensor may be flush with the surrounding surface.

The elongate touch sensitive sensor may be aligned to the bottom edge of the window and have a longitudinal length that substantially matches the longitudinal length of the bottom edge of the window.

The transparent state of the non-transparent zone may be determined according to a plurality of predetermined settings. The controller may be capable of selecting a setting according to the recognition of a second input gesture on the elongate touch sensitive sensor.

According to a further aspect of the present disclosure the privacy system further comprises a noise cancelation system comprising: at least one sound detector configured to detect sound originating from outside the vehicle; and at least one speaker providable within the vehicle, the speaker being configured to emit an audio signal within the vehicle that creates destructive interference with sound outside the vehicle. This mechanism will increase the feeling of privacy within the vehicle.

The privacy system may be further configured to vary the amount of destructive interference depending on the position of the transition line.

The controller may be configured to cause the at least one speaker to emit the audio signal in response to a further input gesture on the elongate touch sensitive sensor.

The system may further comprise a user feedback mechanism capable of being automatically activated at the same time as the at least one speaker emits the audio signal.

The system may further comprise one or more light emitters configured such that light from the light emitters projects from the elongate touch sensitive sensor or interior trim portion and is visible to the user.

The light emitters may indicate the system of the vehicle being controlled. The light emitters may indicate a setting associated with the system of the vehicle being controlled.

According to a further aspect of the present disclosure there is provided a vehicle that may comprise the above-mentioned privacy system.

According to a further aspect of the present disclosure there is provided a method of providing privacy for a vehicle, wherein a privacy system of the vehicle comprises: a window configured to selectively switch between transparent and non-transparent states and to simultaneously have a transparent zone and a non-transparent zone; an elongate touch sensitive sensor provided in a trim portion of the vehicle adjacent to the window, the elongate touch sensitive sensor being aligned to an edge of the window; wherein the elongate touch sensitive sensor is embedded beneath a layer of the trim portion; and a controller configured to receive a signal from the elongate touch sensitive sensor and control the transparency of the window, wherein the method comprises: receiving a signal from the elongate touch sensitive sensor; and controlling the transparency of the window such that a transition line between the transparent zone and the non-transparent zone is substantially aligned with and follows a point at which the elongate touch sensitive sensor is being touched.

The privacy system of the vehicle may further comprise a noise cancelation system. The noise cancelation system may comprise: at least one sound detector configured to detect sound originating from outside the vehicle; and at least one speaker provided within the vehicle. The method may comprise: configuring the at least one speaker to emit an audio signal within the vehicle to create destructive interference with sound outside the vehicle. The method may further comprise varying the amount of destructive interference created depending on the position of the transition line.

BRIEF DESCRIPTION OF THE DRAWINGS

For a better understanding of the new and improved privacy system and method, and to show more clearly how they may be carried into effect, reference will now be made, by way of example, to the accompanying drawings, in which.

DETAILED DESCRIPTION

Figure 1:
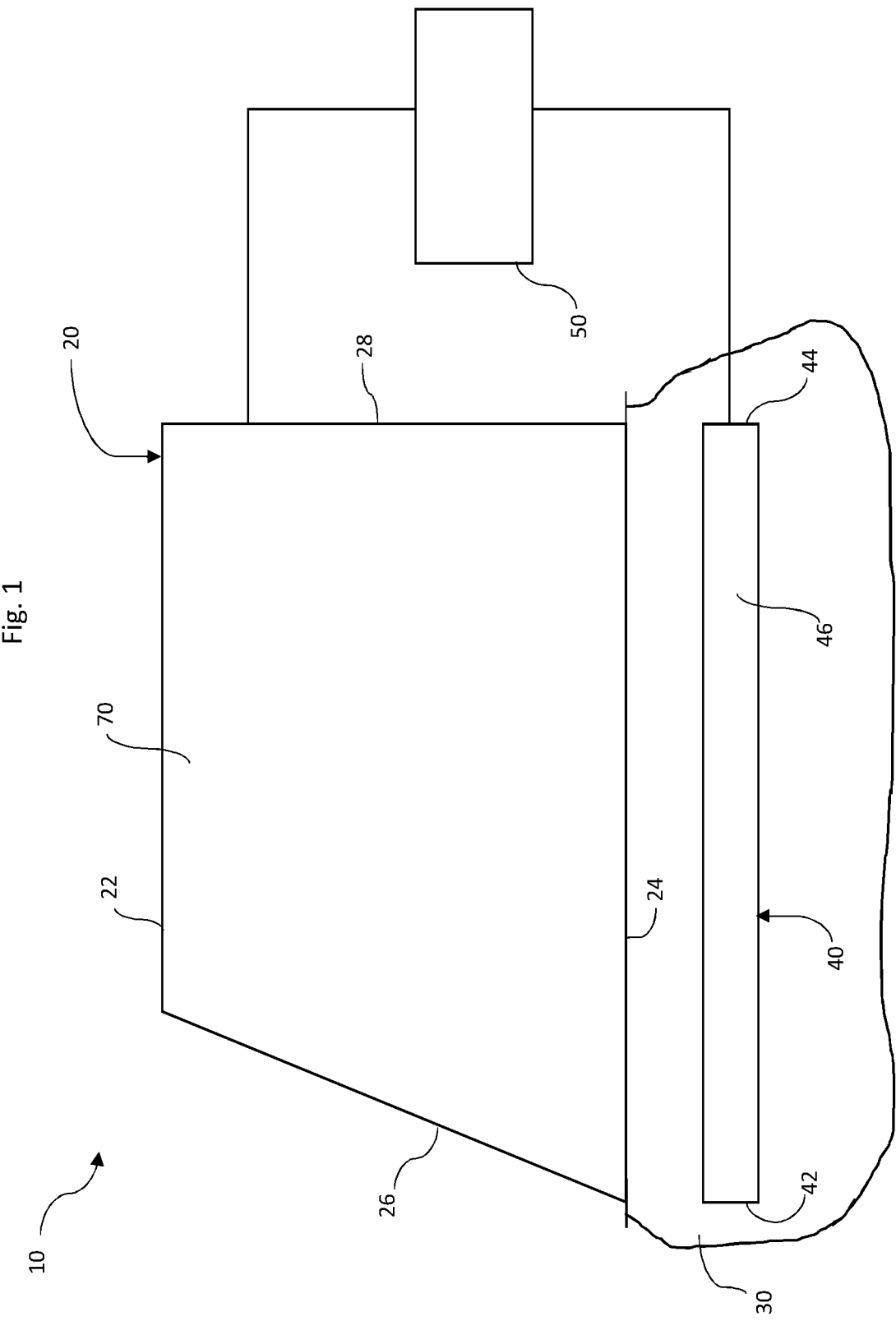
FIG. 1 is a schematic view of a vehicle privacy system according to an arrangement of the present disclosure.

With reference to FIG. 1, a privacy system 10 is shown according to an arrangement of the present disclosure. The system 10 comprises a window 20 within a vehicle, such as a motor vehicle. The window 20 can be any one of the windows on the vehicle, such as the driver window or passenger window. By way of example, the window 20 may be a side window of the vehicle. The window has a top edge 22 indicative of the edge closest to the vehicle roof, a bottom edge 24 indicative of the edge closest to the base of the vehicle, a front edge 26 corresponding to the position of the front end of the vehicle, and a rear edge 28 corresponding to the position of the rear end of the vehicle.

The window 20 may be made of laminated glass and may be substantially transparent allowing light to pass through, e.g. without any significant filtering or blocking, so that objects can be clearly seen through the glass. However, the window 20 is configured to selectively switch between transparent and non-transparent (e.g. opaque or translucent) states. In particular, the window 20 is configured to concurrently have transparent and non-transparent zones. To this end, the window 20 may comprise a display screen 70 that is capable of selectively changing its transparency. The display screen 70 may be a layer of the window, which may or may not have additional layers. The screen 70 can comprise a liquid crystal display (LCD) or light emitting diode display, such as an organic light emitting diode (OLED) display. Alternatively, the screen 70 may comprise any other means for changing the transparency of the window 20.

The interior of the vehicle has interior trim portions which can include any item that is added to the interior of the vehicle to increase its appeal or protect the occupants or the vehicle from damage. Examples of interior trim portions include cloth, imitation or real leather, vinyl, metal, wood grain materials or wooden veneer. The interior trim portion 30 shown in FIG. 2 is the section of vehicle trim that is situated directly adjacent to the window 20 and extending along an axis that runs parallel to the longitudinal axis of that window 20.

Within the interior trim portion 30 is an elongate touch sensitive sensor in the form of a capacitive touch sensor or a resistive touchpad 40. This location of the touchpad 40 allows easy access by a user who would ordinarily be the driver or a passenger seated in the vehicle.

Figure 2:
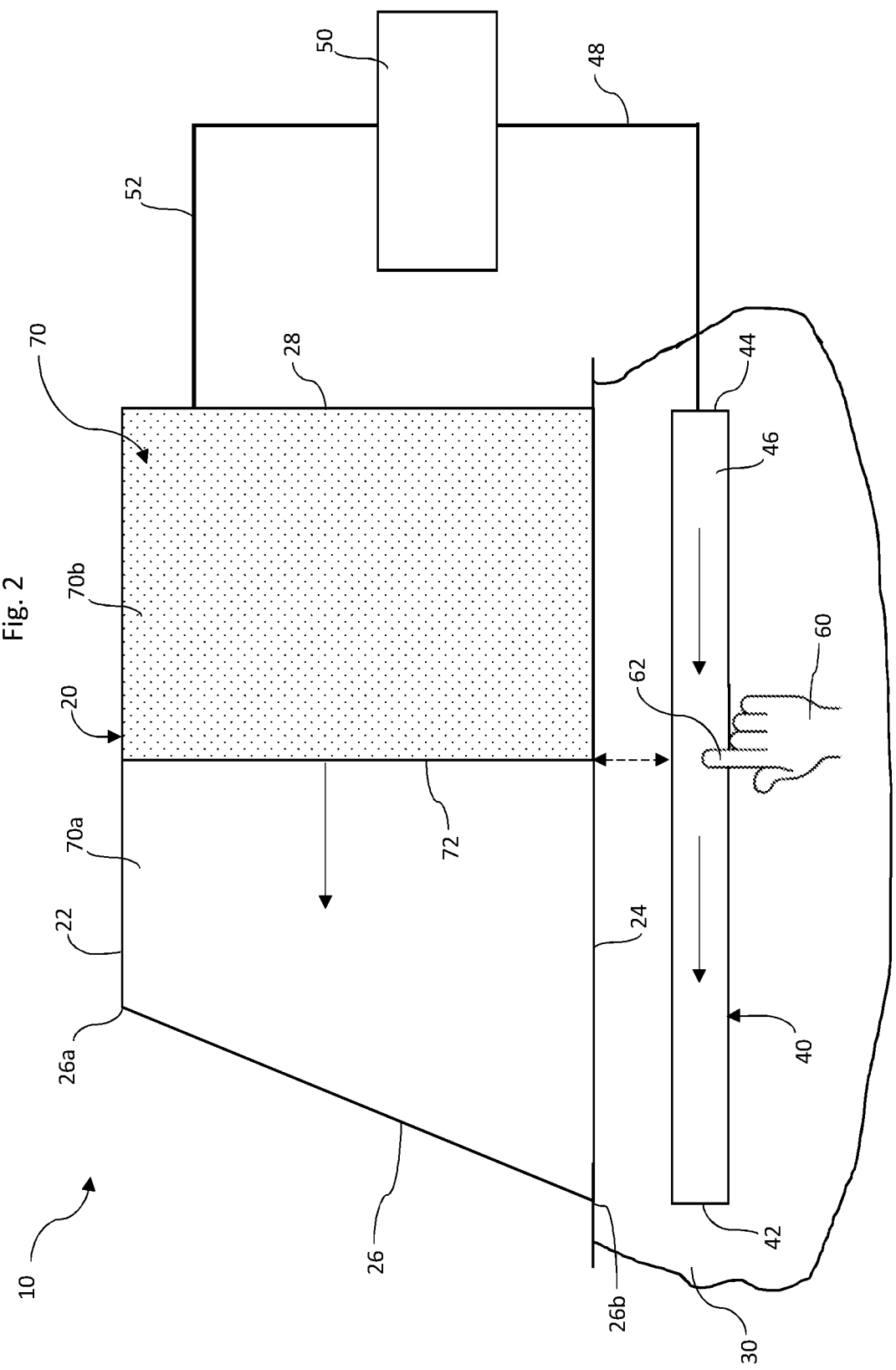
FIG. 2 is a schematic view of the vehicle privacy system according to the arrangement of the present disclosure.

The touchpad 40 represented in FIG. 2 is elongate, e.g. rectangular, in shape with a length greater than its width. The longitudinal length of the touchpad 40 runs from a rear side 44 that corresponds to the rear edge 28 of the window 20 and a rear end 42 that corresponds to the front edge 26 of the window 20. The width of the touchpad 40 should be sufficient to provide a good surface area to accommodate user input gestures. However, it will be appreciated that the touchpad 40 may not necessarily be rectangular and can be any shape and size to allow easy access by a vehicle occupant and to allow effective detecting and/or tracking of the position and motion of user input along the touchpad 40.

The touchpad 40 can be integrated with the interior trim portion 30 such that it sits within and is surrounded by the interior trim portion 30. Edges of the touchpad 40 may be joined to the interior trim portion 30 in such a way that the touchpad 40 sits flush with the surrounding surface of the interior trim portion 30. The touchpad 40 can also embedded beneath the interior trim portion 30 of the vehicle such that it cannot be seen or immediately detected by the user. In such cases the user will already have knowledge of the touchpad 40 prior to its use or a graphical representation of the touchpad 40 may be provided on the interior trim portion 30. The top surface 46 of the touchpad 40 would sit beneath the surface of the interior trim portion 30 and be configured to be able to detect user input along its surface area and through the interior trim portion 30.

The touchpad 40 itself comprises one or more sensors (not shown) configured to sense changes in resistance and/or capacitance when the touchpad 40 is touched (or at least close to being touched in the case of a capacitive sensor) by a user. The user inputs are usually entered by a vehicle occupant who would interface with (e.g. contact) the touchpad 40 and make one of a number of predetermined input gestures. The touchpad sensors detect the position and motion of user input anywhere over the area of the touchpad surface 46 and the sensors will produce corresponding signals.

Signals from the sensors can be received or detected by a controller 50. The controller 50 may track the location of the input gesture based on a comparison of the signals from the plurality of sensors and interpret the signals from the sensor and recognise that they correspond to a specific user input gesture. The user input gestures may comprise a swipe gesture, drag, tap, double tap etc.

The controller 50 can link a specific user input gesture with a desire by the user to execute a function of one or more systems or subsystems of the vehicle. A first input gesture may control a first system or first function of a system of the vehicle; a second input gesture may control a second system or second function of a system of the vehicle and so forth.

The controller 50 can control the execution of a system or function by one or more of the vehicle's systems or subsystems. The controller 50 can therefore control or select the one or more systems or subsystems of the vehicle and control the execution of a function of that system or subsystem based on the user input gestures.

With reference to FIG. 2, operation of the system 10, as explained above, will be described. To begin operation of the system a user typically uses their finger 62 to input a user input gesture on the top surface 46 of the touchpad 40. Alternatively the user may use a stylus etc. The input gesture shown in FIG. 2 is a first input gesture of a swipe gesture or drag along the longitudinal axis of the touchpad 40. The user makes an initial contact on the surface 46 of the touchpad 40, with a finger (or thumb) 62, at a contact point towards the rear side 44 of the touchpad 40. Once the user has made the initial contact with their finger 62 on the touchpad 40 that contact is maintained and then the finger 62 is moved along the surface 46 in a substantially linear direction from the rear side 44 towards the front side 42 of the touchpad 40.

The touchpad sensors are able to detect the location of the initial contact on the surface 46 of the touchpad 40 and the subsequent locations of the contact as the user continues the swipe gesture. The sensors produce an output signal 48, or multiple output signals, corresponding to the detected contact.

The signal 48 produced by the touchpad sensors is detected by the controller 50. The controller 50 will interpret the signals and determine where the contact had been made on the touchpad surface 46 and the movement of that contact about the surface 46. The controller 50 can then recognise that the user is executing a swipe gesture.

The controller 50 will then select and control a switch of the window 20 between a transparent and non-transparent state and the window may simultaneously have a transparent zone 70a and a non-transparent zone 70b. The non-transparent zone 70b is shown in FIG. 2 as a portion of the screen 70, which may be opaque or translucent. The deployment of the non-transparent zone 70b on window 20 may be based on the input gesture being recognised as a swipe gesture.

During deployment, the screen 70 has a transition line shown in FIG. 2 as a leading edge 72 which forms a line extending from the top edge 22 to the bottom edge 24 of the window 20. The leading edge 72 of the screen 70 forms a divide or transition on the window 20 that separates the transparent zone 70a and non-transparent zone 70b. There may be a step change in the transparency between the transparent and non-transparent zones 70a, 70b at the leading edge 72. Alternatively, the transparency may gradually change between the transparent and non-transparent zones 70a, 70b and the change may start to occur at the leading edge 72.

When the controller 50 initiates deployment of the non-transparent zone 70b, the leading edge 72 of the screen, will appear on the window 20. The leading edge 72 can quickly move forward from the rear edge 28 of the window 20 to match the point of first contact by the user's finger 62 on the touchpad 40 and leading edge 72 can appear instantly on the window 20 to match the point of first contact by the user's finger 62 on the touchpad 40. The controller can be programmed to register that any start of a swipe gesture contact within a predetermined rearwards section of the touchpad 40 would signify a user desire to initiate deployment of the non-transparent zone 70b and the controller would begin controlled deployment of the non-transparent zone 70b. In this way it would not always be necessary for the user to initiate the swipe gesture by contacting the touchpad surface 46 at the extreme rear side 44 of the touchpad 40.

As the user continues the swipe gesture along the touchpad 40, the controller 50 will continue to control deployment of the non-transparent zone 70b and control the position of the leading edge 72 of the screen 70 as it moves along the longitudinal axis of the window 20 from the rear edge 28 to the front edge 26. The controller 50 controls the position of the leading edge 72 of the screen 70 to always be at a point along the longitudinal axis of the window that substantially matches the point of contact of the user's finger 62 along the longitudinal axis of the touchpad 40. The leading edge 72 of the screen 70 will therefore appear to the user to be moving along the window 20 in the same position and speed as their finger on the touchpad 40. In the above described manner the user is provided with a feeling of control over the deployment of the screen and the visual effect of the deployment provides a satisfying user experience.

As the contact of the swipe gesture moves toward the front side 42 of the touchpad 40, the leading edge 72 of the screen 70 will move along the window 20, from the rear edge 28 towards the front edge 26. Once the user's finger has reached the front side 42 of the touchpad 40 the leading edge 72 of the screen 70 will also have reached the front edge 26 of the window 20 and the window 20 will be completely covered by the non-transparent zone 70b with no areas left uncovered. User contact on the touchpad 40 may then be broken as the user moves their finger 62 up and away from the touchpad surface 46. The sensors will also detect the location at which the contact is broken.

The controller 50 can be programmed to register that any break in contact within any forward section of the touchpad 40, following a swipe gesture, would signify a user desire for complete deployment of the non-transparent zone 70b. The controller 50 can be programmed to execute full deployment of the non-transparent zone 70b if the user finishes the swipe gesture early by moving their finger 62 up and away from the touchpad surface 46 without making contact to the forward most edge at the rear end 42 of the touchpad 40. The controller 50 would continue to control deployment of the non-transparent zone 70b to move the leading edge 72 forwards to the final section 26b of the window 20 for complete deployment of the non-transparent zone 70b. In this way the user does not always need to finish the swipe gesture at the forward most edge of the front side 42 of the touchpad 40 to cause the non-transparent zone 70b to completely deploy across the window 20.

Alternatively, the user can use a further input mechanism, such as a switch or further input gesture, to signal the controller 50 that they want to deploy the non-transparent zone 70b. In this case the controller 50 will not need to first interpret the signals 48 from the touchpad sensors to recognise a swipe gesture, the controller 50 will automatically start to control the deployment of the non-transparent zone 70b and leading edge 72 based in the position and movement of the user input on the touchpad 40.

The user can control deployment of the non-transparent zone 70b in the opposite direction, to uncover the window 20, in the same way as described above by executing a swipe gesture in the opposite direction starting at or towards the front side 42 of touchpad 40. Additionally or alternatively, the non-transparent zone 70b may be deployed in a vertical direction, in which case a vertically orientated touchpad may be provided.

The controller can also be programmed to recognise that if a user initiates a swipe gesture, but takes their finger off the touchpad 40, or stops movement of their finger along the touchpad 40, at any point in a predetermined section of the touchpad, for example the middle section of the window, then deployment of the non-transparent zone 70b could also stop with the position of the leading edge 72 on the window 20 again matching the point of last contact, or halted movement of the contact, on the touchpad 40. This would result in only a partial deployment of the non-transparent zone 70b across the window 20 and the user obtaining partial privacy within the vehicle. The user could then decide to extend deployment of the leading edge in either direction by contacting the touchpad 40 at a point substantially matching the position of the leading edge 72 on the window 20 and then continuing the swipe gesture in either direction. The controller 50 would again recognize the continuation of the swipe gesture and continue to control deployment of the leading edge 72 in either direction accordingly.

The controller 50 may also control other windows of the vehicle. For example, the touchpad 40 may control a plurality of windows. In this way, a single gesture may increase (or decrease) the opacity (e.g. by moving the leading edge 72) of each of the plurality of windows. Additionally or alternatively, each of the plurality of windows may have its own touchpad to control a respective window. The controller may be toggled between a first mode, in which the plurality of windows are controlled by a single touchpad, or a second mode, in which the windows are independently controlled by respective touchpads.

Figure 3:
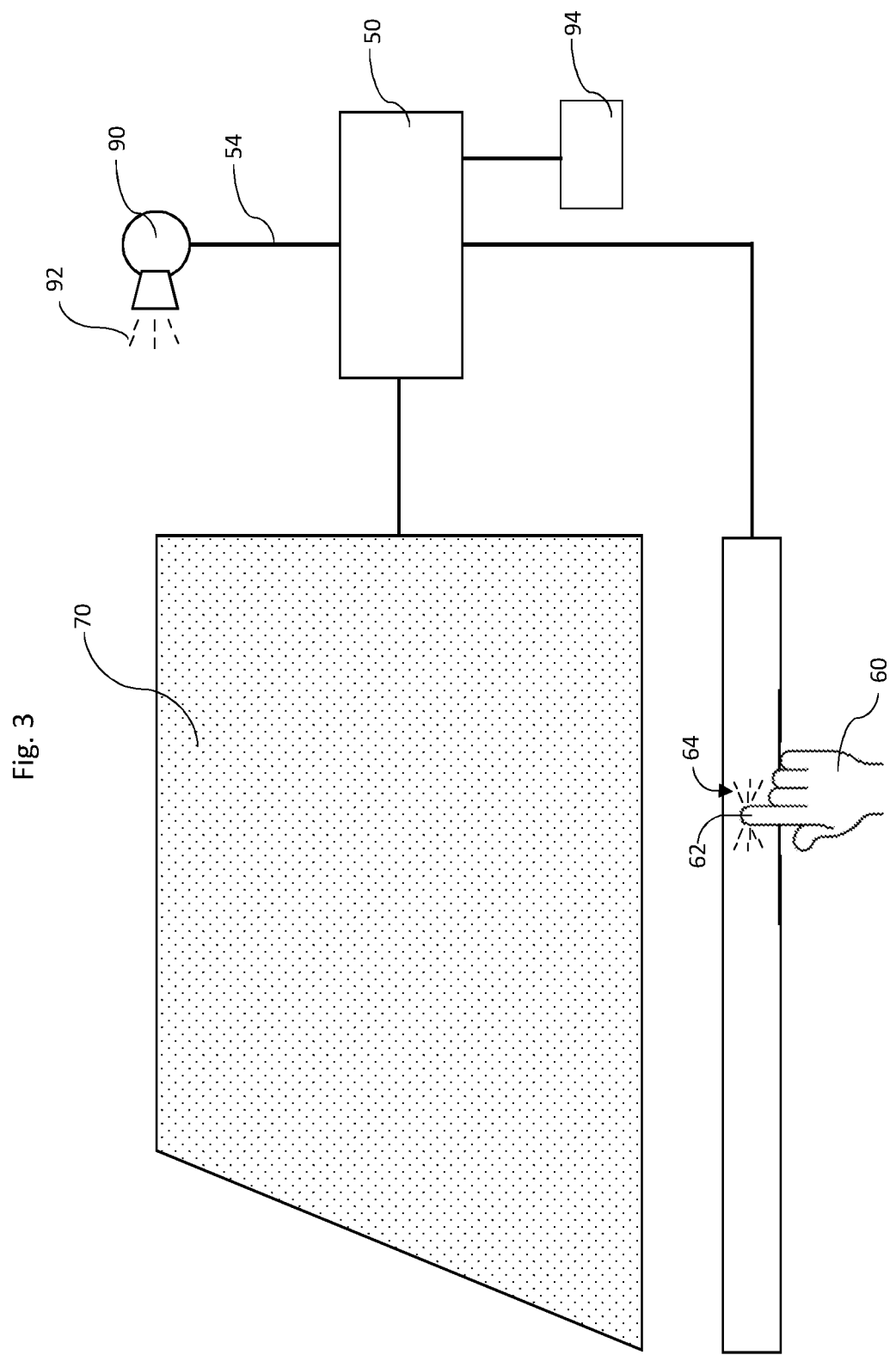
FIG. 3 is a schematic view of the vehicle privacy system according to the arrangement of the present disclosure.

With reference to FIG. 3, the controller 50 may be capable of recognising a number of user input gestures executed on the touchpad 40. The controller 50 may then be capable of controlling one or further systems or further functions of a system of the vehicle depending on that user input gesture.

When the user inputs a further input gesture, such as a double tap 64, then the touchpad sensors may register that contact has been made on the touchpad 40. As before, the controller 50 can received the information from the touchpad sensors and determine that the input gesture was a double tap. The controller 50 will then execute a further system of the vehicle based on that double tap input gesture.

If the controller 50 recognises the relevant input gesture then the controller will activate one or more speakers 90. The speakers 90 may form part of an audio sound system of the vehicle although it will be appreciated that different or additional speakers may form part of such an audio sound system.

Alternatively the speakers 90 can be controlled by a separate switch within the vehicle. Furthermore, the speakers 90 can be set to activate automatically when the non-transparent zone 70b is fully deployed on the window 20.

Once activated, the speakers 90 emit a noise cancelling signal 92 into the interior of the vehicle. The privacy system 10 can also include at least one sound detector 94 that can detect sound originating from outside the vehicle. The noise cancelling signal 92 will attenuate the outside noise that is detected by the sound detector 94. The effect of the noise cancelling signal 92 on the occupant of the vehicle is a significant reduction of their experience of the noise outside the vehicle and this will provide an increased sense of privacy and relaxation within the vehicle.

However, the noise cancelling signal can be programmed not to block out certain noises such as an emergency siren from an emergency response vehicle. Alternatively, the system can be programmed to automatically switch itself off when an emergency vehicle siren is detected.

The system 10 can also be configured to vary the amount of destructive interference depending on the position of the transition line. In this manner the amount of noise cancellation can increase from a starting level corresponding to a first contact on the touchpad 40 to a maximum level when the contact is broken on the touchpad 40 and the non-transparent zone 70b is fully deployed. In this manner the outside noise will appear to the user to be gradually reduced at the same time as the non-transparent zone 70b is gradually deployed on the window.

With reference to FIGS. 4(a), 4(b) and 4(c), before the non-transparent zone 70b is first deployed on the window 20 the user can set the screen 70 to initially be deployed as transparent, opaque or translucent.

The user can set the screen 70 to block light that would ordinarily penetrate the window such that the user is in a darker environment. Light could be blocked to such an extent that a user cannot see through the window 20 to see the outside world and a person outside the vehicle cannot see into the vehicle to see the user. Alternatively, the screen could block the outside world from seeing into the vehicle whilst still allowing a user to see out of the vehicle to provide one-way privacy. The screen 70 can also be set to completely block all light from passing through the window or to only partially block the light from passing through the vehicle window 20.

The choice of the form the screen 70 will take, and the extent to which transparency will be controlled on first deployment can be controlled by the user from within the vehicle by means of a switch or further input gesture or equivalent.

If the screen 70 is set to block light then when the non-transparent zone 70b is completely deployed it will cover the area of the window 20 and will prevent a predetermined amount of light from penetrating through from one side of the window to the other. The amount of light that the screen 70 prevents from penetrating the window can be predetermined according to a setting within a series of settings. For example, as depicted in FIG. 4(a) a first setting 74 would block substantially all light; and as depicted in FIG. 4(b) a second setting 76 would allow more light through than the first setting. As depicted in FIG. 4(c), progressively more light may be allowed to penetrate the window in a subsequent setting 78.

Once the non-transparent zone 70b has been completely or partially deployed, the penetration of light through the window can then be controlled by the user. An input gesture, for example a tap gesture, would result in the controller 50 switching the screen from its current setting to the next setting in the series of settings. Each tap gesture inputted on the touchpad 40 would result in the controlling selecting the next setting and the screen 70 allowing more light to penetrate through the window 20.

The settings could also be set to repeat in a cycle such that the settings are progressed through sequentially with each input gesture. The controller 50 could select the first setting once the final setting been selected and then a further input gesture has been executed by the user.

Figure 5:
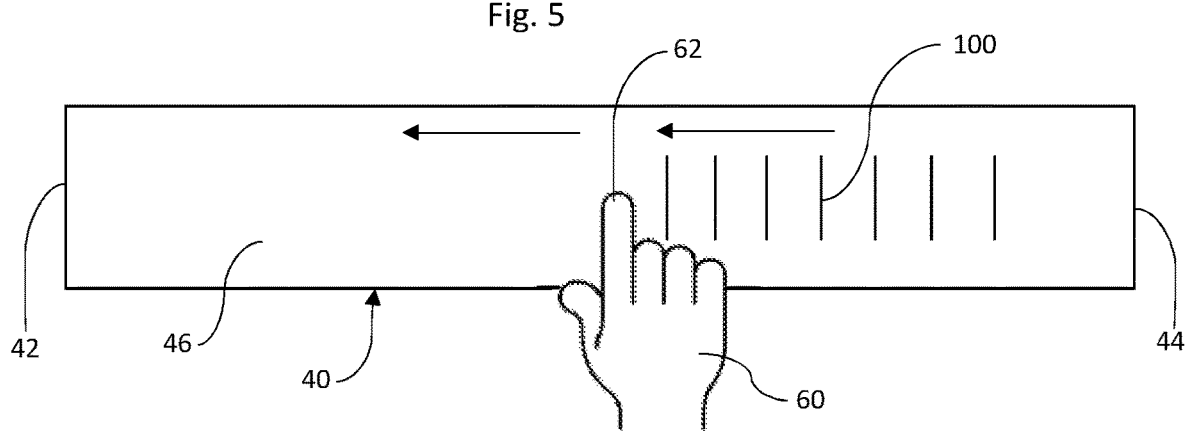
FIG. 5 is a schematic view of the an elongate touch sensitive sensor according to the arrangement of the present disclosure.

With reference to FIG. 5, the touchpad 40 includes a user feedback mechanism to give feedback to the user as to the current point of deployment of the non-transparent zone 70b across the window 20 when compared to a complete deployment of the non-transparent zone 70b across the window. Alternatively, the user feedback mechanism could be included within the interior trim portion 30 of the vehicle or any other means for displaying a feedback to the user.

The feedback mechanism includes optics that are capable of projecting an image to the underside of the touchpad 40 to provide an indication 100 to the user as to the extent of deployment of the non-transparent zone 70b. As the user's finger 62 moves along the touchpad 40 the indication 100 would appear to the user as their finger passed over that point of the touchpad 40.

The indication 100 is shown in FIG. 5 as a vertical line but it could be any indication such as a number or graphic. The image projected by each of the light emitters of the optics may be fixed or the light emitter may be capable of projecting a changing image. The light emitters may be configured so as to project light towards a particular location or a range of locations on the underside of the touchpad 40. The light emitters may each emit a particular colour or they each may be capable of emitting one or more colours.

Figure 6:
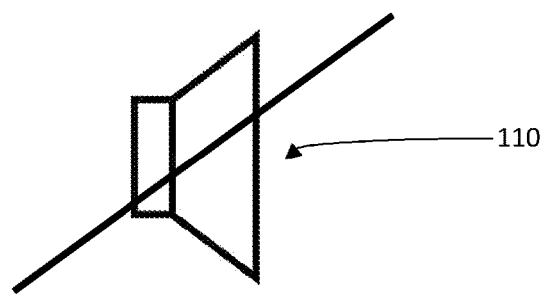
FIG. 6 is a schematic view of a user feedback mechanism according to the arrangement of the present disclosure.

With reference to FIG. 6, the system 10 includes a further user feedback mechanism to give feedback to the user as to the activation of the speakers 90 to emit the noise cancelling signal 92. This user feedback mechanism is shown as a graphical symbol 110 but it could be any mechanism that provides an indication to user that the speakers are activated and currently emitting noise cancelling signal.

This feedback mechanism associated with the speakers 90 is especially useful because once the speakers 90 have been activated, and noise cancelling signal 92 emitted, then the user may grow accustomed to the reduction in noise and forget that the speakers have been activated.

Figure 7:
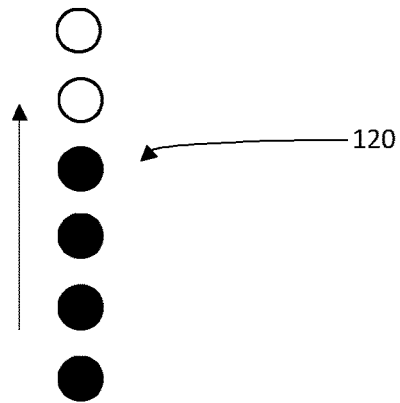
FIG. 7 is a schematic view of a user feedback mechanism according to the arrangement of the present disclosure.

With reference to FIG. 7, the system 10 includes a further user feedback mechanism to give feedback to the user as to the point of the cycle of the light control settings described above and in reference to FIG. 4.

This user feedback mechanism is shown as a series of circles 120 that change colour in sequence as each light setting is activated by the user.

Figure 4:
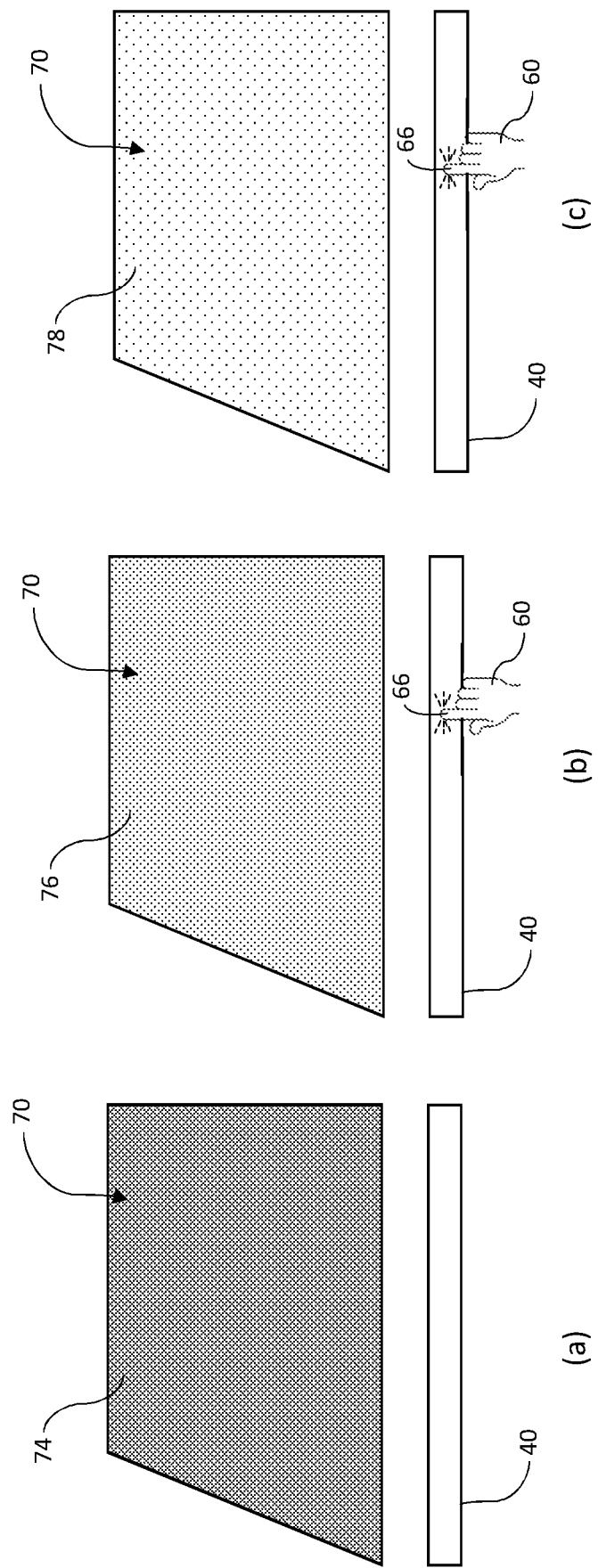
FIGS. 4(*a*), 4(*b*) and 4(*c*) are schematic views of an elongate touch sensitive sensor and controller of the vehicle privacy system according to the arrangement of the present disclosure.

This feedback mechanism associated with the light settings of FIG. 4 is useful because it demonstrates to the user the current setting in the series of settings related to the window 20.

Any of the user feedback mechanisms can be included in the touchpad 40, on the interior trim portion 30 or any other portion of the vehicle that would allow easy viewing by the user. These user feedback mechanisms can themselves be further touchpads or switches so that they are activated independently from the touchpad 40.

Figure 8:
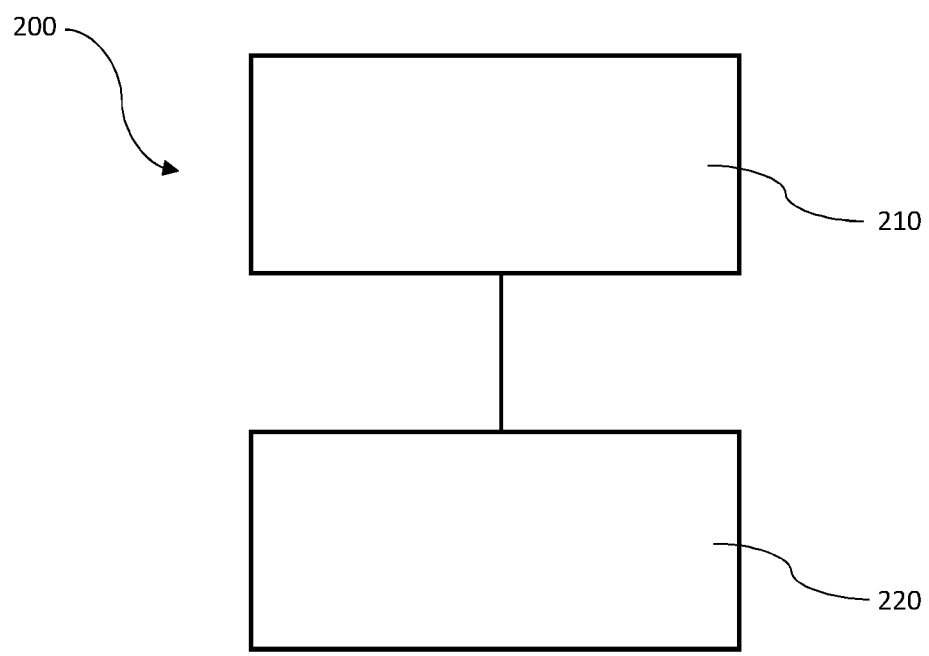
FIG. 8 depicts a method according to an arrangement of the present disclosure.

FIG. 8 depicts a method 200 comprising a first step 210 and a second step 220. The first step 210 comprises receiving a signal from the elongate touch sensitive sensor 40. The second step 220 comprises controlling the transparency of the window 20 such that the transition line 72 between transparent zone and the non-transparent zone is substantially aligned with and follows a point at which the elongate touch sensitive sensor is being touched. The method 200 may further comprise configuring the at least one speaker 90 to emit an audio signal within the vehicle to create destructive interference with sound outside the vehicle. In particular, the amount of destructive interference created may vary depending on the position of the transition line.

It will be appreciated by those skilled in the art that although the privacy system and related method have been described by way of example, with reference to one or more examples, it is not limited to the disclosed examples and alternative examples may be constructed without departing from the scope of the appended claims.

What is claimed:

1. A privacy system for a vehicle, comprising:
   a window configured to selectively switch between a transparent state and a non-transparent state and to simultaneously have a transparent zone and a non-transparent zone;
   an elongate touch sensitive sensor positioned in a trim portion of the vehicle adjacent to the window such that the elongate touch sensitive sensor is aligned to, extends along and matches a length of an edge of the window; and
   a controller configured to receive a signal from the elongate touch sensitive sensor and control transparency of the window such that a transition line between the transparent zone and the non-transparent zone is substantially aligned with and follows a point at which the elongate touch sensitive sensor is being touched.

2. The privacy system of claim 1 wherein the elongate touch sensitive sensor is embeddable beneath a layer of the trim portion.

3. The privacy system of claim 2, wherein the non-transparent zone is opaque or translucent.

4. The privacy system of claim 3, wherein the non-transparent zone blocks a predetermined amount of light from passing through the window.

5. The privacy system of claim 1, wherein the window comprises a Liquid Crystal Display (LCD) or an Organic Light Emitting Diode Display (OLED).

6. The privacy system of claim 1, wherein the elongate touch sensitive sensor comprises a capacitive touch sensor.

7. The privacy system of claim 1, wherein the elongate touch sensitive sensor is aligned to a bottom edge of the window and has a longitudinal length that substantially matches the longitudinal length of the bottom edge of the window.

8. The privacy system of claim 1, wherein the transparent state of the non-transparent zone can be determined according to a plurality of predetermined settings.

9. The privacy system of claim 8, wherein the controller is capable of selecting a setting according to recognition of a second input gesture on the elongate touch sensitive sensor.

10. The privacy system of claim 1, wherein the privacy system further comprises a noise cancelation system including:
    at least one sound detector configured to detect sound originating from outside the vehicle; and
    at least one speaker providable within the vehicle, the speaker being configured to emit an audio signal within the vehicle that creates destructive interference with sound outside the vehicle.

11. The privacy system of claim 10, wherein the privacy system is further configured to vary an amount of destructive interference depending on a position of the transition line.

12. The privacy system of claim 10, wherein the controller is configured to cause the at least one speaker to emit the audio signal in response to a further input gesture on the elongate touch sensitive sensor.

13. The privacy system of claim 10, further comprising a user feedback mechanism capable of being automatically activated at the same time as the at least one speaker emits the audio signal.

14. The privacy system of claim 1, further comprising one or more light emitters configured such that light from the light emitters projects from the elongate touch sensitive sensor or interior trim portion and is visible to a user.

15. The privacy system of claim 14, wherein the light emitters indicate the system of the vehicle being controlled.

16. The privacy system of claim 14, wherein the light emitters indicate a setting associated with the system of the vehicle being controlled.

17. A vehicle comprising the privacy system of claim 1.

18. A method of providing privacy for a vehicle, comprising:
configuring a window to selectively switch between a transparent state and a non-transparent state and to simultaneously have a transparent zone and a non-transparent zone;
providing an elongate touch sensitive sensor in a trim portion of the vehicle adjacent to the window, the elongate touch sensitive sensor being aligned to, extending along and matching a length of an edge of the window, wherein the elongate touch sensitive sensor is embedded beneath a layer of the trim portion; and
configuring a controller to receive a signal from the elongate touch sensitive sensor and control transparency of the window;
wherein said signal is received from the elongate touch sensitive sensor; and
the transparency of the window is controlled such that a transition line between the transparent zone and the non-transparent zone is substantially aligned with and follows a point at which the elongate touch sensitive sensor is being touched.

19. The method of claim 18, including:
configuring at least one sound detector to detect sound originating from outside the vehicle; and
providing at least one speaker within the vehicle,
wherein the at least one speaker is configured to emit an audio signal within the vehicle to create destructive interference with sound outside the vehicle.

20. The method of claim 19, including varying an amount of said destructive interference created depending on a position of the transition line.

* * * * *